United States Patent [19]

Stadler et al.

[11] 4,341,275

[45] Jul. 27, 1982

[54] MEASURING APPARATUS WITH ELECTROMAGNETIC FORCE COMPENSATION AND CAPACITIVE POSITION SENSOR

[75] Inventors: Eberhard Stadler, Göttingen; Franz-Josef Melcher, Hardegsen, both of Fed. Rep. of Germany

[73] Assignee: Sartorius GmbH, Fed. Rep. of Germany

[21] Appl. No.: 249,420

[22] Filed: Mar. 31, 1981

[30] Foreign Application Priority Data

Apr. 3, 1980 [DE] Fed. Rep. of Germany ....... 3012979

[51] Int. Cl.³ .............................................. G01G 7/02
[52] U.S. Cl. ................................ 177/212; 177/210 C; 318/662; 361/278; 361/283
[58] Field of Search .......................... 177/212, 210 C; 340/870.37; 318/662; 361/278, 283

[56] References Cited

U.S. PATENT DOCUMENTS 3,786,678  1/1974  Kunz ................................ 177/212 X
4,170,269 10/1979  Kunz ................................ 177/212 X

*Primary Examiner*—Joseph W. Hartary
*Attorney, Agent, or Firm*—Eric P. Schellin

[57] ABSTRACT

An electromagnetically compensating measuring apparatus, as in force measuring or weighing devices, wherein a compensation coil is wound upon a coil form movable in the air gap of a stationary permanent magnet system having a pole plate, a capacitive position sensor is connected to detect the position of the compensation coil, and an automatic volume control amplifier is series-connected to the position sensor so as to follow it, with the output of the amplifier connected to feed the compensation coil to tend to hold it in a predetermined zero position, and wherein the coil form and the pole plate each form an electrode of the position sensor.

5 Claims, 2 Drawing Figures

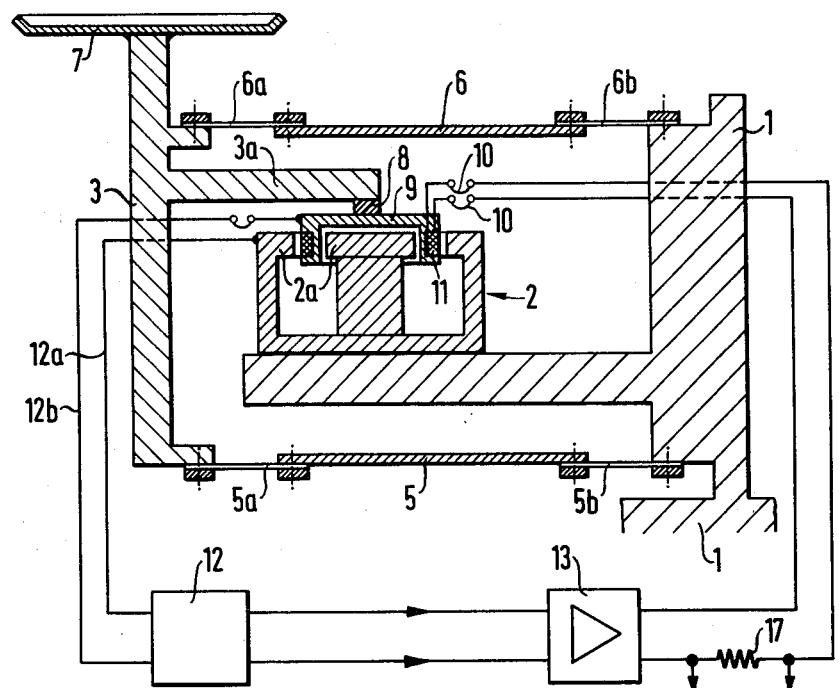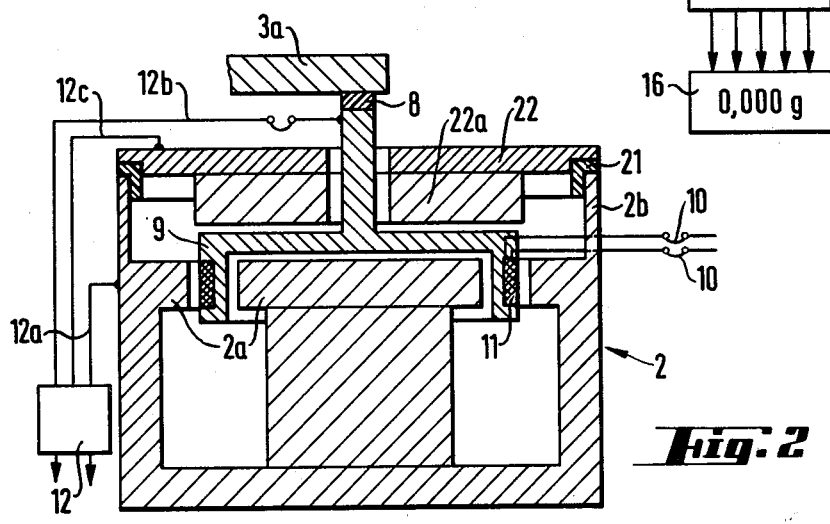

MEASURING APPARATUS WITH ELECTROMAGNETIC FORCE COMPENSATION AND CAPACITIVE POSITION SENSOR

BACKGROUND OF THE INVENTION

1. Field of the Invention

The invention relates to an electromagnetically compensating force-measuring or weighing apparatus with a compensation coil that is wound upon a coil form and movable in the air gap of a stationary permanent magnet system, with a capacitive position sensor for the position of the compensation coil, and with an automatic volume control amplifier series-connected to the position sensor so as to follow it, and whose output current feeds the compensation coil and strives to hold it in a prespecified zero position.

2. Prior Art

Electromagnetically compensating force-measuring or weighing devices are known. An embodiment with capacitive position sensor is described, e.g., in U.S. Pat. No. 2,680,012. A general view relating to the various structures of capacitive position sensors is presented, e.g., by Christof Rohrbach in the "Handbuch des elektrischen Messens mechanischer Grössen" ("Handbook on Electric Measurement of Mechanical Values") (1967). In most cases, the capacity variation of two electrodes upon variation of the space therebetween is utilized. In high precision force-measuring or weighing devices, usually two capacities are provided which vary in opposite directions, in order to achieve a higher zero-point stability. One electrode is, in this case, mounted on the movable part of the force-measuring or weighing apparatus and can move between two stationary electrodes. In this process, the capacity of the movable electrode with relation to one of the stationary electrodes increases, while the capacity of the movable electrode with relation to the other stationary electrode decreases. At smaller demands made on the position sensor, two electrodes whose capacity in the zero position is of a prespecified rated value are sufficient.

A disadvantage of this structure according to the prior art is, on the one hand, the large space required for the aereal electrodes, and on the other hand, the electrodes may, e.g., be distorted by temperature gradients, so that another zero position of the compensation coil of the force measuring or weighing apparatus results, with a consequent indication error. Besides, the electrical screening of the electrodes is frequently difficult (see e.g., Th. Gast/W. Kästel in VDI Berichte (VDI Reports) 312, 1978, page 15).

SUMMARY OF THE INVENTION

The object of the invention is, therefore, to provide a capacitive position sensor for an electromagnetically compensating force-measuring or weighing apparatus which practically requires no additional space, ensures a reproducible zero position and can easily be electrically screened.

According to the invention, this is achieved by a device wherein the coil form of the compensation coil, and the pole plate of the permanent magnet system each form one electrode of the position sensor.

When the permanent magnet system is provided with a soft-magnetic stationary cover plate which reduces the stray field of the permanent magnet system in the outer area, a particularly advantageous embodiment is produced since this cover plate is electrically insulated from the permanent magnet system and serves as the third electrode of the position sensor. In order to keep the distance between the three electrodes as small as possible in this structure without moving the cover plate too closely to the air gap, the cover plate is suitably provided, at the side facing the permanent magnet system, with a non-magnetic, electrically conductive reinforcement. The thickness of the latter should be chosen in such a way that the coil form of the compensation coil in its prespecified zero position is equally distant from the pole plate of the permanent magnet system and from the reinforcement of the cover plate, so that the capacity between the coil form of the compensation coil and the pole plate of the permanent magnet system, and the capacity between the coil form of the compensation coil and the cover plate with its reinforcement in the prespecified zero position of the compensation coil are of at least approximately the same value.

In order to produce good expansion conditions for the alternating voltage of the capacitive position sensor on the electrodes, the pole plate of the permanent magnet system should be provided with a good electrically conductive coat; and the same applies to the cover plate if it is used as a third electrode.

Due to the capacitive position sensor in the electromagnetically compensating force-measuring or weighing apparatus of the invention, the installation of separate electrodes is completely eliminated. Likewise, a good mechanical fixation of the mutual position of the most important functional elements for the electromagnetic force compensation, namely of the permanent magnet system, the compensation coil and the electrodes of the position sensor, results, so that even at temperature gradients or shocks a reproducible zero position is assured. Likewise, the screening is simple and assured without additional elements, in the embodiment with a cover plate for the permanent magnet system.

BRIEF DESCRIPTION OF THE DRAWINGS

The invention is further described with the aid of the drawings, wherein:

FIG. 1 is a diagrammatic view of a weighing apparatus according to the invention, with a first form of the capacitive position sensor; and FIG. 2 is an enlarged fragmentary section of a weighing apparatus analogous to FIG. 1, with a second form of the capacitive position sensor.

DETAILED DESCRIPTION OF THE PREFERRED EMBODIMENTS

In the drawings, wherein like reference numerals indicate like parts throughout the several views, the mechanical portion of the weighing apparatus, which is shown in section in FIG. 1, consists of a movable load receiver 3 which supports the load pan 7 and is connected, via two control levers 5 and 6 in the form of a parallel construction, with the stationary section 1 of the weighing apparatus. Leaf springs 5a, 5b, 6a, 6b at the ends of control levers 5 and 6 serve in each case as joints. A coil form 9 is fastened to a protruding arm 3a of the load receiver 3 via an insulating intermediate piece 8, which coil form supports compensation coil 11 which interacts with the field of a stationary permanent magnet system 2. The coil form 9 and pole plate 2a of the permanent magnet system 2 each form an electrode of a capative position sensor, which via lines 12a and 12b are connected to the input of an evaluation circuit 12 which transmits to an automatic volume control amplifier 13 a direct voltage signal dependent on the capacity at the input. The automatic volume control amplifier 13 supplies the compensation current which is fed via movable supply lines 10 to coil 11 and flows simultaneously through a measuring resistor 17. At measuring resistor 17 a current-proportional measuring voltage is tapped, digitized in an analog/digital converter 14, processed in a digital computer circuit 15, and indicated in a digital indication 16. The electronic structural components 12–16 are known, per se, to persons having ordinary skill in the art and do not comprise a part of the invention, so that a detailed description thereof is not necessary and is not provided.

FIG. 2 shows the permanent magnet system and the capacitive position sensor in another development. Here the capacitive position sensor consists of three electrodes, so that a better zero point stability is obtained. The edge of permanent magnet system 2 is extended in the form of a thin cylinder 2b and closed by a soft-magnetic cover plate 22. This decreases strongly the extension of the magnetic stray field into the outer area. Between cover plate 22 and extension 2b of the permanent magnet system, a thin insulation 21 is inserted which electrically insulates cover plate 22 from permanent magnet system 2 without substantially impending the transition of the magnet lines of flux. On the bottom side, cover plate 22 is provided with a non-magnetic, electrically conductive reinforcement 22a with approximately the diameter of coil form 9. This reinforcement is so thick that between it and the top side of coil form 9, as between the bottom side of coil form 9 and the pole plate 2a of the permanent magnet system 2, only a small distance remains ($\leq 1$ mm) in order to ensure a sufficient sensitivity of the capacitive position sensor. The two stationary electrodes of the capacitive position sensor, namely, the pole plate 2a of the permanent magnet system, and the cover plate 22 with its reinforcement 22a, are connected via supply lines 12a and 12c to the evaluation circuit 12. The movable electrode, namely, the coil form 9, is connected via a movable supply line 12b to the evaluation circuit 12. Evaluation circuit 12 should be designed in such a way that its output signal becomes zero when the capacity between its connections 12a and 12b equals the capacity between connections 12c and 12b. The zero position of the movable section of the force-measuring or weighing apparatus is then such that coil form 9 is positioned approximately midway between pole plate 2a and the reinforcement 22a of the cover plate. In this case, the characteristic curve of the capacitive position sensor is somewhat linear, whereby the regulation behavior is favorably affected. Evaluation circuit 12 generates for the capacity measurement at its input connections 12a and 12b or, respectively, 12a, 12b and 12c, a high-frequency alternating voltage. In order to ensure the uniform expansion of this alternating voltage over the entire surface of the electrode involved, it is suitable to provide the soft-magnetic constituents, that is to say the pole plate 2a and, if directly used, the cover plate 22, with a good electrically conductive coat which extends to the connections 12a or, respectively 12c, involved.

The combination of the capacitive position sensor with the compensation system which consists of coil form, coil and permanent magnet system in accordance with the invention is described by means of an example of a weighing apparatus with its parallel construction according to Roberval. It can, of course, also be used for weighing devices with lever transmission, likewise also for force-measuring devices without substantial changes. Besides, it is, e.g., possible to employ the capacitive position sensor described for both systems in weighing devices which contain in addition to the load system a reference system in a separate air gap of the same or a second permanent magnet system (e.g. DE-OS No. 2,924,081).

What is claimed is:

1. An electromagnetically compensating apparatus, comprising:
    a stationary permanent magnet system having a pole plate and an air gap;
    a compensation coil wound upon a coil form and movable in the air gap of the permanent magnet system;
    a capacitive position sensor connected to detect the position of the compensation coil; and
    an automatic volume control amplifier series-connected to the position sensor so as to follow it, and whose output current feeds the compensation coil and strives to hold it in a prespecified zero position; wherein the coil form of the compensation coil, and the pole plate of the permanent magnet system each form an electrode of the position sensor.

2. A measuring apparatus as in claim 1, further comprising:
    a soft-magnetic, stationary cover plate for the permanent magnet system which reduces the stray field of the permanent magnet system wherein the cover plate is electrically insulated from the permanent magnet system and represents a third electrode of the position sensor.

3. A measuring apparatus as in claim 2, wherein: the soft-magnetic cover plate is provided on the side that faces the permanent magnet system with a non-magnetic, electrically conductive reinforcement.

4. A measuring apparatus as in claim 1, wherein: the capacity between the coil form of the compensation coil and the pole plate of the permanent magnet system, and the capacity between the coil form of the compensation coil, and the cover plate with its reinforcement are, in the prespecified zero position of the compensation coil, of at least approximately the same value.

5. A measuring apparatus as in one of claims 1, 2, 3 or 4, wherein: the pole plate of the permanent magnet system and the cover plate are provided with a coating of good electric conductivity.

* * * * *